Sept. 27, 1949.  H. C. ROTERS  2,483,024
METHOD OF MANUFACTURING DYNAMOELECTRIC MACHINES
Filed March 3, 1945
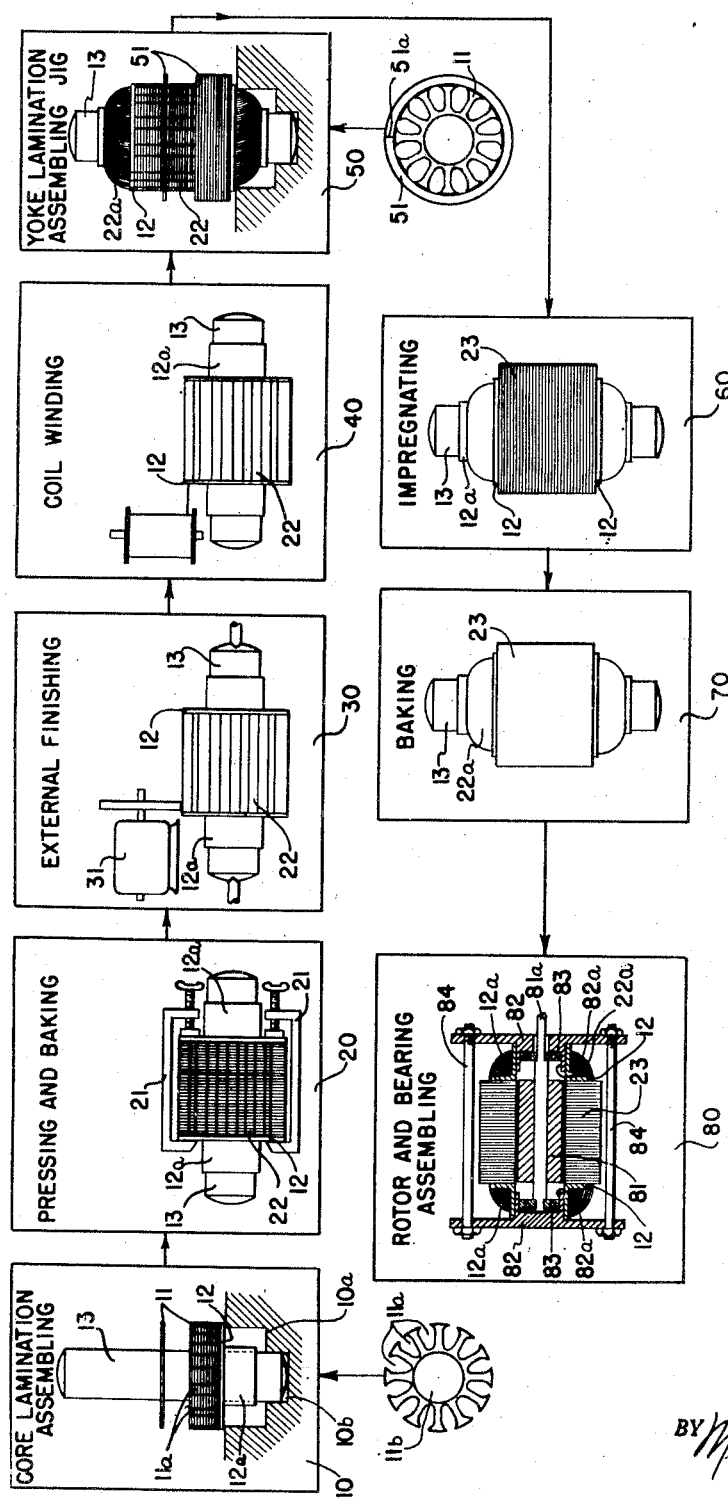
INVENTOR.
HERBERT C. ROTERS
BY Mueller, Dodds & Mason
ATTORNEYS Patented Sept. 27, 1949

2,483,024

UNITED STATES PATENT OFFICE 2,483,024

METHOD OF MANUFACTURING DYNAMO-ELECTRIC MACHINES

Herbert C. Roters, Roslyn, N. Y., assignor, by mesne assignments, to Casner Patents, Inc., New York, N. Y., a corporation of New York Application March 3, 1945, Serial No. 580,904

5 Claims. (Cl. 29—155.53)

This invention relates to a method of manufacturing dynamoelectric machines and, while it is of general application, it is particularly adapted to the manufacture of fractional horsepower alternating-current motors and generators and is particularly advantageous for the manufacture of self-starting hysteresis synchronous motors.

The method of manufacturing dynamoelectric machines described and claimed herein constitutes an improvement upon that described in applicant's prior Patent No. 2,423,345, granted July 1, 1947.

Fractional horsepower motors have a wide range of application in industrial and domestic appliances. In the past these have generally been of the direct-current or universal commutated-armature type or of the induction or synchronous types with distributed polyphase armature windings. The former type has the disadvantages of all commutator machines, namely, they are subject to wear and misadjustment of the commutator brushes and sparking at the commutator, with the resultant wear and possible short circuiting of the commutator. In addition, they create troublesome high-frequency interference which is disturbing to radios and other domestic appliances. The latter type has the disadvantage that, for a given power output, they are of relatively large volume and weight and are subject to high cost of manufacture. For example, in these small motors of the alternating-current type with internal slots, it is customary to wind the coil in the open slot of the stator one turn at a time by threading the wire through the stator tunnel with a winding gun or by preforming the coil outside of the machine and inserting it in the slot one conductor at a time.

Further in such fractional horsepower motors it is necessary, in order to procure reasonable power output, to keep the air gap of the motor to a minimum which requires a high degree of concentricity between the motor frame, the bearing housing, the stator tunnel and the rotor. In order to obtain the required degree of concentricity, the motor structures of the prior art have required a number of grinding, turning or other machining operations, some external and some internal. These finishing operations are among the most costly in the manufacturing process and have seriously limited prior attempts to reduce the cost of this type of motor to a figure competitive with the universal motor in spite of the superior performance of the non-commutated motors.

It is an object of the invention, therefore, to provide a new and improved method of manufacturing dynamoelectric machines by means of which the above-mentioned disadvantages and limitations of the prior art dynamoelectric machines may be avoided.

It is another object of the invention to provide a new and improved method of manufacturing dynamoelectric machines by means of which there may be produced a machine having high performance characteristics while at the same time being simple and inexpensive in construction.

In accordance with the invention, in the manufacture of an alternating-current dynamoelectric machine, the method of manufacturing a unitary stator structure by the use of an accurately finished cylindrical rotor-tunnel mandrel comprises punching a series of annular core laminations with external winding slots and a circular internal opening closely fitting the mandrel, assembling a stack of such laminations and supporting bearing-sleeve plates on the mandrel. The method also comprises disposing a winding in the external slots, forming a magnetic yoke about the core structure and at one or more predetermined points in the preceding sequence of operations disposing a layer of adhesive insulating material between adjacent laminations and between said laminations and said plates and setting said adhesive, thereby to form a unitary core structure with an accurately predetermined smooth, continuous cylindrical bore suitable for the reception of a rotor structure.

Further in accordance with the invention, in the manufacture of a dynamoelectric machine, on a unitary stator structure of the type described, as assembled, there is assembled directly a stack of annular yoke laminations, there is applied a thermosetting adhesive to the last-formed assembly which is then subjected to heat to form a unitary stator structure, and a co-operating rotor is then mounted within the bore of the core structure and supported solely therefrom.

By the term "closely fitting" as used herein and in the appended claims is meant a fitting such that the elements may be assembled without substantial force but in which there is no appreciable play in the assembled elements.

For a better understanding of the invention, together with other and further objects thereof, reference is had to the following description taken in connection with the accompanying drawings while its scope will be pointed out in the appended claims.

Referring now to the drawing, the single figure is a schematic layout of a system for practicing the method of the invention for the manufacture of dynamoelectric machines, particularly for the manufacture of fractional horsepower alternating-current motors.

Referring now to the drawing, there is represented schematically a layout of an apparatus for constructing an alternating-current dynamoelectric machine in accordance with the method of the invention by the use of an accurately finished cylindrical rotor-tunnel mandrel. The process comprises initially manufacturing a unitary stator structure which is initiated in the unit 10, in which a stack of electrically insulated annular core laminations 11 and supporting bearing-sleeve plates 12 are assembled on an accurately finished cylindrical rotor-tunnel mandrel 13. For this purpose, a series of annular core laminations 11 are punched from suitable magnetic sheet material and are preferably in the form shown immediately below the unit 10, each having external winding slots 11a and a central circular internal punching or opening 11b closely fitting the mandrel 13. The unit 10 comprises a suitable jig 10a having a recess 10b for receiving the mandrel 13 during assembly. The mandrel 13 should be dusted with graphite or similar material to prevent bonding of the laminations 11 and the end plates 12 thereto during the assembling process to be described. The bearing-sleeve plates 12 have integral extending bearing sleeves 12a and the plates 12 and sleeves 12a are also bored to a close fit on the mandrel 13. The laminations are preferably formed of conventional high-permeability magnetic material, while the end plates 12 are preferably of non-magnetic material having high-resistivity, such as stainless steel.

During the assembling process, a layer of adhesive insulating material such as a thermosetting adhesive is applied between successive laminations 11 and between the terminal laminations and the bearing-sleeve plates 12, and a stack of the laminations and the plates 12 are then assembled on the mandrel, as illustrated. The adhesive material used for this purpose may be a polyvinyl-butyral resin or phenolic modification thereof or a copolymer of vinyl acetate and vinyl chloride or it may be furfural resin. The laminations must be substantially free from scale and preferably have a bright finish to ensure a good bond. However if the laminations of this type were directly bonded together by adhesive and heat and pressure applied, the adhesive would be squeezed out and the resistance between laminations would be reduced nearly to zero, resulting in large eddy-current losses. Therefore it has been found desirable succesively to apply to the laminations a plurality of coatings of thermosetting adhesive and individually at least partially setting said coatings, as by successively dipping and baking the laminations individually several times, to obtain at least a partial, and preferably a complete, polymerization or setting of the adhesive. A final coating is then applied to the laminations prior to assembling. This process avoids the squeezing of the adhesive from between the laminations when pressure is applied, as described hereinafter, and the resultant impairment of the electrical insulation between the adjacent laminations.

Upon the assembly of the coated core laminations as described, they are placed under axial pressure in unit 20, by means such as represented schematically by the clamps 21, and heat is applied to the assembly while still on the mandrel 13 to finally set the adhesive between the laminations and between the terminal laminations and the end plates 12. This method is effective to secure the laminations 11 and bearing-sleeve plates 12 together without substantially impairing their insulation, the thermosetting adhesive material uniting the laminations 11 and plates 12 to form a unitary core structure 22 which, when removed from the mandrel 13, has an accurately predetermined, smooth, continuous, cylindrical bore suitable as assembled and without any further finishing operation for the reception of a rotor structure. In this connection, it has been found that the adhesive between the laminations 11, when the unit is subjected to pressure, as by clamps 21, fills any voids between the inner peripheries of the laminations and the mandrel and those due to any irregularities or non-parallelism between the laminations and between the laminations and the bearing-sleeve plates. As a result, the rotor-tunnel is an accurately predetermined continuous, true, cylindrical surface, which contributes to a minimum of air losses and noise during operation of the motor. Furthermore, the several laminations 11 and the plates 12 are maintained in accurate alignment by the very close fit on the mandrel 13 and by the filling of any voids by the adhesive, irrespective of any slight irregularities or non-parallelism, so that the inner bores of the bearing sleeves 12a are accurately concentric and continuous with the rotor tunnel in the core structure 22.

Following the assembly process described above, the unitary core structure 22 is similar to that of the armature of a conventional direct-current motor. This core structure is then suitable for winding and the addition of an outer annular magnetic yoke. In order to minimize the number of machining operations, a series of annular yoke laminations 51 are punched with circular openings of uniform size. The size of these openings, after punching, is then accurately measured and the exterior peripheral surface of the unitary core structure 22 is accurately finished to a smooth cylindrical surface closely fitting the openings of the annular yoke laminations 51. This finishing may be by turning or, as illustrated, by grinding by means of a grinder 31 in an external finishing unit 30.

A coil winding 22a is then disposed in the external slots of the unitary core structure 22 in the coil winding unit 40. This winding 22a may be formed in any well-known manner, as by an automatic coil-winding machine, and in any desired conventional winding pattern.

The unit 22 is then transferred to the assembling jig of unit 50 wherein the annular yoke laminations 51 are individually fitted over and assembled on the finished and wound core structure 22 to form a magnetic yoke about the core structure. The relation of the yoke laminations 51 to the core laminations 11 is shown immediately below the unit 50, the plates 12 and winding 22a being omitted for the sake of clarity. When the core structure 22 is assembled and finished, as described, the yoke laminations 51 will fit thereon closely and will stay in position. The stack of yoke laminations 51 is made equal in height to the stack of core laminations 10 and the finally assembled unitary stator structure 23 formed thereby is then transferred to a unit 60 wherein there is applied a suitable impregnating insulating compound, for example a thermosetting resin. During the impregnating process, care should be taken to prevent the seepage of the impregnating compound between the stator tunnel and the mandrel 13 to prevent binding of the stator 23 to the mandrel. To this end, the ends of the bearing sleeves 12a may be sealed to the mandrel 13 by cellulose tape or equivalent. The impregnated stator structure 23 is then transferred to a unit 70 wherein it is baked to dry or set the impregnating compound and to bind the core structure 22, the winding 22a and the annular yoke laminations 51 securely together into a unitary stator structure. If desired, pressure may be applied to the stack of yoke laminations 51 during this baking step.

In the manufacture of certain dynamoelectric machines in which the performance requirements are not too exacting, a series of annular yoke laminations 51 may be punched, each having a circular opening fitting as closely as possible the core structure 22 as assembled and without any further finishing operations. In order to facilitate the assembly of the yoke laminations 51 on the core structure 22 and to reduce the air gap therebetween to a minimum, the laminations may be punched to have an internal diameter exactly equal to outside diameter of the core structure 22 and then given a single radial cut 51a so that they can spring on the core structure 22. In either case, the external finishing in unit 30 may be omitted and a stack of the annular yoke laminations 51 may be individually assembled directly on the core structure 22, as assembled, to form a magnetic yoke. In case cut laminations 51 are utilized the radial cuts of successive laminations should be staggered about the periphery in order not to increase the reluctance of the yoke.

At this point in the process, the mandrel 13 may be removed, leaving, as stated above, a stator tunnel which has an accurate and continuous cylindrical surface suitable for the direct reception of a cylindrical rotor without any machining operation. The stator structure 23 is then transferred to a rotor and bearing assembling unit 80 and a cooperating rotor 81 is disposed within the bore or tunnel of the stator structure and is supported solely from such structure. A supporting frame is also attached solely by engaging the bore of the bearing sleeves 12a. For example, the frame may comprise a pair of cylindrical end plates 82, 82 having formed thereon integral hubs 82a, the outer surfaces of which are turned or otherwise accurately finished to fit closely the inner bores of the bearing sleeves 12a. A pair of bearings, such as antifriction bearings 83, are mounted at either end of the bearing sleeves 12a and coaxial therewith, either by mounting them directly in the bores of the end sleeves 12a or, as shown, in the inner bores of the hubs 82a of the end plates 82, and the shaft 81a of the rotor 81 is mounted in the bearings 83. With this construction, all of the elements of the dynamoelectric machine are centered by reference to the continuous cylindrical bore of the stator structure 23, thus facilitating the procurement of the very highest degree of concentricity between the several normally concentric elements of the machine. The end plates 82 are brought up flush with the ends of the bearing sleeves 12a and retained firmly in position by any suitable means such as bolts 84.

While dynamoelectric machines constructed in accordance with the method described above may be of any of numerous types, the method of the invention is particularly applicable to the manufacture of fractional horsepower hysteresis motors and particularly to motors having power outputs of the order of $1/1000$–$1/10$ horsepower. In hysteresis motors of this type, the rotor 81 may be constructed of a low-permeability shaft 81a, for example of stainless steel, surrounded by a sleeve or annular core of material having a high-hysteretic constant, such as a permanent-magnet steel or an aluminum-nickel-cobalt alloy. Alternatively, the rotor 81 may be constructed in the form of any of the rotors illustrated and described in Patent No. 2,328,743, granted September 7, 1943, on my application and entitled "Self-starting hysteresis motor." In motors of this type, because of the high degree of concentricity obtainable, even without any internal finishing operations, it has been found possible to operate with air gaps as low as 0.003", thereby contributing to high efficiency and high-power output for any given dimensions and weight. This last described feature constitutes no part of the present invention, but is described and claimed in applicant's copending application Serial No. 625,878, filed October 31, 1945, entitled "Self-starting hysteresis motor." The operation of such a hysteresis motor is substantially as described in the aforesaid Patent 2,328,743.

While there has been described what is at present considered to be the preferred embodiment of the invention, it will be apparent to those skilled in the art that various changes and modifications may be made therein without departing from the spirit or scope of the invention.

What is claimed as new is:

1. In the manufacture of an alternating-current dynamoelectric machine, the method of manufacturing a unitary stator structure by the use of an accurately finished cylindrical rotor-tunnel mandrel which comprises, punching a series of angular core laminations each having external winding slots and a circular internal opening closely fitting said mandrel, assembling a stack of said laminations and bearing-sleeve plates on said mandrel while stretching any such laminations as may be undersized, disposing a winding in said external slots, forming a magnetic yoke about said core structure, and at one or more predetermined points in the preceding sequence of operations disposing a layer of adhesive insulating material between adjacent laminations and between said laminations and said plates and setting said adhesive, thereby to form a unitary core structure with an accurately predetermined smooth continuous cylindrical bore having final dimensions determined substantially solely by said mandrel and suitable as assembled for the reception of a rotor structure.

2. In the manufacture of an alternating-current dynamoelectric machine, the method of manufacturing a unitary stator structure by the use of an accurately finished cylindrical rotor-tunnel mandrel which comprises, punching a series of annular core laminations each having external winding slots and a circular internal opening closely fitting said mandrel, forming a pair of bearing-sleeve plates having integral extending bearing sleeves to a close fit on said mandrel, assembling a stack of said laminations and said bearing-sleeve plates on said mandrel while stretching any such laminations as may be undersized, disposing a winding in said external slots, forming a magnetic yoke about said core structure, and at one or more predetermined points in the preceding sequence of operations disposing a layer of adhesive insulating material between adjacent laminations and between said laminations and said plates and setting said adhesive, thereby to form a unitary core structure with an accurately predetermined smooth continuous cylindrical bore having final dimensions determined substantially solely by said mandrel and suitable as assembled for the reception of a rotor structure.

3. In the manufacture of an alternating-current dynamoelectric machine, the method of manufacturing a unitary stator structure by the use of an accurately finished cylindrical rotor-tunnel mandrel which comprises, punching a series of annular core laminations each having external winding slots and a circular internal opening closely fitting said mandrel, assembling a stack of said laminations and bearing-sleeve plates on said mandrel while stretching any such laminations as may be undersized, disposing a winding in said external slots, punching a series of annular yoke laminations each having a circular opening closely fitting said core structure as assembled, assembling a stack of said yoke laminations directly on said core structure as assembled to form a magnetic yoke about said core structure, and at one or more predetermined points in the preceding sequence of operations disposing a layer of adhesive insulating material between adjacent laminations and between said laminations and said plates and setting said adhesive, thereby to form a unitary core structure with an accurately predetermined smooth continuous cylindrical bore having final dimensions determined substantially solely by said mandrel and suitable as assembled for the reception of a rotor structure.

4. In the manufacture of an alternating-current dynamoelectric machine, the method of manufacturing a unitary stator structure by the use of an accurately finished cylindrical rotor-tunnel mandrel which comprises, punching a series of annular core laminations each having external winding slots and a circular internal opening closely fitting said mandrel, assembling a stack of said laminations and bearing-sleeve plates on said mandrel while stretching any such laminations as may be undersized, disposing a winding in said external slots, punching a series of annular yoke laminations each having a circular opening closely fitting said core structure as assembled, assembling a stack of said yoke laminations directly on said core structure as assembled to form a magnetic yoke about said core structure, and at one or more predetermined points in the preceding sequence of operations disposing a layer of adhesive insulating material between adjacent laminations and between said laminations and said plates and setting said adhesive, thereby to form a unitary core structure with an accurately predetermined smooth continuous cylindrical bore having final dimensions determined substantially solely by said mandrel and suitable as assembled for the reception of a rotor structure, and applying impregnating insulating compound to said last-formed assembly and subjecting it to heat to form a unitary stator structure.

5. In the manufacture of an alternating-current dynamoelectric machine, the method of manufacturing a unitary stator structure by the use of an accurately finished cylindrical rotor-tunnel mandrel which comprises, punching a series of annular core laminations each having external winding slots and a circular internal opening closely fitting said mandrel, assembling a stack of said laminations and bearing-sleeve plates on said mandrel while stretching any such preceding sequence of operations disposing a winding in said external slots, punching a series of annular yoke laminations having circular openings of uniform size, finishing the external surface of said core structure to a smooth cylindrical surface closely fitting said openings of said yoke laminations, assembling a stack of said yoke laminations on said finished core structure to form a magnetic yoke about said core structure, and at one or more predetermined points in the preceding sequence of operations disposing a layer of adhesive insulating material between adjacent laminations and between said laminations and said plates and setting said adhesive, thereby to form a unitary core structure with an accurately predetermined smooth continuous cylindrical bore having final dimensions determined substantially solely by said mandrel and suitable as assembled for the reception of a rotor structure.

HERBERT C. ROTERS.

REFERENCES CITED

The following references are of record in the file of this patent:

UNITED STATES PATENTS

| Number | Name | Date |
|---|---|---|
| 755,819 | Watmough | Mar. 29, 1904 |
| 1,440,952 | Apple | Jan. 2, 1923 |
| 1,661,135 | Knight | Feb. 28, 1928 |
| 1,877,254 | Ritter | Sept. 13, 1932 |
| 1,957,380 | Barlow | May 1, 1934 |
| 1,978,100 | Buerke | Oct. 23, 1934 |
| 2,025,817 | Lanz | Dec. 31, 1935 |
| 2,039,456 | Sammarons | June 5, 1936 |
| 2,057,503 | Sawyer | Oct. 13, 1936 |
| 2,183,404 | Morrill | Dec. 12, 1939 |
| 2,187,033 | Hubacker | Jan. 16, 1940 |
| 2,304,607 | Sleeter | Dec. 8, 1942 |
| 2,322,924 | Daiger | June 29, 1943 |
| 2,328,743 | Roters | Sept. 7, 1943 |

Certificate of Correction

Patent No. 2,483,024 September 27, 1949

HERBERT C. ROTERS

It is hereby certified that errors appear in the printed specification of the above numbered patent requiring correction as follows:

Column 8, line 20, strike out "preceding sequence of operations" and insert instead the words and comma *laminations as may be undersized,*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*